United States Patent
Pham et al.

(10) Patent No.: US 10,104,997 B2
(45) Date of Patent: Oct. 23, 2018

(54) EXTERNAL MOTOR DRIVE SYSTEM FOR WINDOW COVERING SYSTEM WITH CONTINUOUS CORD LOOP

(71) Applicant: AXIS LABS INC., Toronto, Ontario (CA)

(72) Inventors: Trung Duc Pham, Brampton (CA); Alan Wing Hor Cheng, Mississauga (CA); Marc Rashad Bishara, Toronto (CA)

(73) Assignee: AXIS Labs Inc. (CA)

( * ) Notice: Subject to any disclaimer, the term of this patent is extended or adjusted under 35 U.S.C. 154(b) by 63 days.

(21) Appl. No.: 15/282,686

(22) Filed: Sep. 30, 2016

(65) Prior Publication Data

US 2017/0095103 A1    Apr. 6, 2017

Related U.S. Application Data

(60) Provisional application No. 62/236,826, filed on Oct. 2, 2015.

(51) Int. Cl.
*F16D 65/14* (2006.01)
*A47H 5/032* (2006.01)
(Continued)

(52) U.S. Cl.
CPC .............. *A47H 5/0325* (2013.01); *E06B 9/24* (2013.01); *E06B 9/322* (2013.01); *E06B 9/70* (2013.01);
(Continued)

(58) Field of Classification Search
CPC ............ H05B 37/0272; H05B 37/0227; H05B 33/0815; G05B 15/02; G08C 17/02
See application file for complete search history.

(56) References Cited

U.S. PATENT DOCUMENTS

| 2,788,481 A | 4/1957 | Lui et al. |
| 2,798,194 A | 7/1957 | Cantin et al. |

(Continued)

FOREIGN PATENT DOCUMENTS

| CA | 398637 | 8/1941 |
| CA | 926345 | 5/1973 |

(Continued)

OTHER PUBLICATIONS

International Search Report and Written Opinion dated Jan. 11, 2016 corresponding to International Patent Application No. PCT/CA2015/051140, 8 pages.

(Continued)

*Primary Examiner* — Zoheb Imtiaz
(74) *Attorney, Agent, or Firm* — Eric L. Sophir; Dentons US LLP

(57) ABSTRACT

A motor drive system for operating a mechanism for raising and lowering window coverings includes a motor operating under electrical power and an electrically powered drive system. The motor drive system advances a continuous cord loop in response to positional commands from a controller. An input-output device includes a capacitive touch strip that receives user inputs along an input axis, and an LEDs strip aligned with the input axis. A group mode module communicates the positional commands to other motor drive systems within an identified group to operate respective other mechanisms of the other motor drive systems. A set control module enables user calibration of a top position and a bottom position of travel of the window covering. The input-output device extends vertically on the exterior of a housing for the motor drive system, and the housing supports input buttons of the group mode module and the set control module.

17 Claims, 14 Drawing Sheets

(51) Int. Cl.
| | |
|---|---|
| *E06B 9/24* | (2006.01) |
| *E06B 9/322* | (2006.01) |
| *E06B 9/70* | (2006.01) |
| *E06B 9/74* | (2006.01) |
| *H02P 1/16* | (2006.01) |
| *E06B 9/68* | (2006.01) |
| *F16H 19/06* | (2006.01) |

(52) U.S. Cl.
CPC .................. *E06B 9/74* (2013.01); *H02P 1/16* (2013.01); *E06B 2009/6818* (2013.01); *E06B 2009/6827* (2013.01); *E06B 2009/6845* (2013.01); *F16H 19/06* (2013.01); *F16H 2019/0681* (2013.01)

(56) References Cited

U.S. PATENT DOCUMENTS

| | | |
|---|---|---|
| 3,096,078 A | 7/1963 | Hermann et al. |
| 3,117,767 A | 1/1964 | Mclean et al. |
| 3,269,454 A | 8/1966 | Gill et al. |
| 3,561,520 A | 2/1971 | Gill et al. |
| 4,031,944 A | 6/1977 | Morrison et al. |
| 4,131,831 A | 12/1978 | Bochenek et al. |
| 4,610,294 A | 9/1986 | Anesi et al. |
| 4,618,804 A * | 10/1986 | Iwasaki ................ E06B 9/32 160/DIG. 17 |
| 4,775,039 A | 10/1988 | Sunakawa |
| 4,819,708 A | 4/1989 | Onosato et al. |
| 4,856,574 A | 8/1989 | Minami et al. |
| 4,902,953 A | 2/1990 | Kraft et al. |
| 4,914,360 A | 4/1990 | Hsieh et al. |
| 4,956,588 A | 9/1990 | Ming |
| 4,958,112 A | 9/1990 | Zerillo |
| 5,033,527 A | 7/1991 | Ouvrard et al. |
| 5,170,108 A | 12/1992 | Peterson et al. |
| 5,270,629 A | 12/1993 | Hsieh |
| 5,414,334 A | 5/1995 | Cheron |
| 5,465,980 A | 11/1995 | Maurin |
| 5,532,560 A | 7/1996 | Element et al. |
| 5,540,269 A | 7/1996 | Plumer |
| 5,547,008 A | 8/1996 | Sullivan |
| 5,847,525 A | 12/1998 | Cheron et al. |
| 6,076,592 A | 6/2000 | Grutzner |
| 6,283,190 B1 | 9/2001 | Hu et al. |
| 6,598,652 B1 | 7/2003 | Montesinos Alonso |
| 6,827,121 B2 | 12/2004 | Park |
| 6,935,403 B2 | 8/2005 | Killo et al. |
| 7,337,825 B1 | 3/2008 | Erbe |
| 7,360,576 B2 | 4/2008 | Lin |
| 7,389,806 B2 | 6/2008 | Kates |
| 7,599,612 B2 | 10/2009 | Moseley et al. |
| 7,919,939 B2 | 4/2011 | Mosbrucker |
| 8,044,626 B2 | 10/2011 | Adamus et al. |
| 8,368,328 B2 | 2/2013 | Mullet et al. |
| 9,080,382 B2 | 7/2015 | Lagarde et al. |
| 2001/0050538 A1* | 12/2001 | Kovach ................ E06B 9/32 318/16 |
| 2003/0168187 A1 | 9/2003 | Wen et al. |
| 2004/0026049 A1 | 2/2004 | Park |
| 2006/0162877 A1 | 7/2006 | Chou |
| 2012/0090797 A1* | 4/2012 | Mullet ................ E06B 9/322 160/331 |
| 2012/0193035 A1 | 8/2012 | Malekpour |
| 2012/0261078 A1* | 10/2012 | Adams ................ E06B 9/32 160/6 |
| 2013/0135333 A1* | 5/2013 | Chen ................ H05B 33/0863 345/589 |
| 2013/0146436 A1 | 6/2013 | Ticoalu et al. |
| 2014/0008028 A1 | 1/2014 | Rastegar |
| 2014/0138033 A1 | 5/2014 | Lagarde et al. |
| 2014/0224437 A1* | 8/2014 | Colson ................ E06B 9/42 160/291 |
| 2015/0074584 A1 | 3/2015 | Sasaki et al. |
| 2015/0349402 A1* | 12/2015 | Camden ................ H01Q 13/10 343/702 |
| 2017/0257927 A1* | 9/2017 | Camden ................ H01Q 13/10 |
| 2017/0260806 A1* | 9/2017 | Adams ................ E06B 9/32 |

FOREIGN PATENT DOCUMENTS

| | | |
|---|---|---|
| CA | 1283471 | 4/1991 |
| CA | 2162443 | 5/1996 |
| CA | 2385368 | 9/2003 |
| CA | 2532092 | 7/2007 |
| CA | 2804238 | 1/2012 |
| CA | 2766358 | 7/2012 |
| DE | 19837267 A1 | 2/2000 |
| EP | 1700996 A2 | 9/2006 |
| GB | 2362675 A | 11/2001 |
| WO | 2014165367 A1 | 10/2014 |
| WO | 2017054083 A1 | 4/2017 |

OTHER PUBLICATIONS

"Installing AXIS Gear"—Video published on Oct. 27, 2015, with video playback webpage of YouTube, LLC, at https://www.youtube.com/watch?v=u6IBDl6e720.

"AXIS Gear—Installation Demo"—Video published on May 3, 2016, with video playback webpage of YouTube, LLC, at https://www.youtube.com/watch?v=HuzzblmAB91.

"AXIS Gear—Motorize your window shades"—Video published on Jun. 28, 2016, with video playback webpage of YouTube, LLC, at https://www.youtube.com/watch?v=E12YGTvchCw.

"AXIS Gear—Calibration Demo"—Video published on May 31, 2016, with video playback webpage of YouTube, LLC, at https://www.youtube.com/watch?v=GYgtDjHlt_w.

"Motorize your window shades with AXIS Gear"—Video published on Oct. 26, 2015, with video playback webpage of YouTube, LLC, at https://www.youtube.com/watch?v=dJgA8I.cjnnU.

"Controlling the AXIS Gear"—Video published on Oct. 27, 2015, with video playback webpage of YouTube, LLC, at https://www.youtube.com/watch?v=-e2WSkKVx-zM.

"AXIS Gear—The Timeless Art of Seduction"—Video published on Nov. 9, 2015, with video playback webpage of YouTube, LLC, at https://www.youtube.com/watch?v=zgZBNhEQaYM.

"Axis Gear raising window shades"—Video published on Dec. 29, 2015, with video playback webpage of YouTube, LLC, at https://youtube.com/watch?v=LUB0xSB2Evw.

"Wake Up to Sunshine with AXIS Gear"—Video published on Nov. 3, 2015, with video playback webpage of YouTube, LLC, at https://www.youtube.com/watch?v=RE2hMiJdvnQ.

"Lifestyle Video AXIS Gear 2MIN"—Video published on Apr. 7, 2016, with video playback webpage of YouTube, LLC, at https://www.youtube.com/watch?v=NvJxe3tzrPc.

"CEDIA 2016: AXIS Launches AXIS Gear at CEDIA 2016"—Video published on Sep. 15, 2016, with video playback webpage of YouTube, LLC, at https://www.youtube.com/watch?v=9PLOkAt-tfvc.

"AXIS Gear—Motorize Your Window Shades & Curtains"—Video published on Nov. 7, 2015, with video playback webpage of YouTube, LLC, https://www.youtube.com/watch?v=5PgSF194pDE.

Lutron® Intelligent Hembar AlignmentTM; Technical White Paper; May, 2010; 8pages.

Non-Final Office Action in U.S. Appl. No. 14/934,642 dated Sep. 15, 2016, 8 pages.

International Search Report issued in PCT/CA2016/051138, date of mailing of International Search Report: dated Jan. 17, 2017, 6 pages.

* cited by examiner

EXTERNAL MOTOR DRIVE SYSTEM FOR WINDOW COVERING SYSTEM WITH CONTINUOUS CORD LOOP

CROSS-REFERENCE TO RELATED APPLICATION

The present application claims benefit of U.S. Provisional Application No. 62/236,826 filed Oct. 2, 2015, entitled "ON-DEVICE MULTI-CONTROL OF EXTERNALLY MOUNTED DEVICE TO MOTORIZE WINDOWS COVERINGS", the entire contents of which are hereby incorporated by reference.

TECHNICAL FIELD

The present disclosure relates to a system for spreading and retracting window coverings that use continuous cord loops, and more particularly to an external motor drive device for a system for spreading and retracting window coverings.

BACKGROUND

Window covering systems for spreading and retracting coverings for architectural openings such as windows, archways and the like are commonplace. Systems for spreading and retracting such window coverings may operate for example by raising and lowering the coverings, or by laterally opening and closing the coverings. (Herein the terms spreading and retracting, opening and closing, and raising and lowering window coverings are all used, depending on context). Such window covering systems typically include a headrail or cassette, in which the working components for the covering are primarily confined. In some versions, the window covering system includes a bottom rail extending parallel to the headrail, and some form of shade material which might be fabric or shade or blind material, interconnecting the headrail and bottom rail. The shade or blind material is movable with the bottom rail between spread and retracted positions relative to the headrail. For example, as the bottom rail is lowered or raised relative to the headrail, the fabric or other material is spread away from the headrail or retracted toward the headrail so it can be accumulated either adjacent to or within the headrail. Such mechanisms can include various control devices, such as pull cords that hang from one or both ends of the headrail. The pull cord may hang linearly, or in the type of window covering systems addressed by the present invention, the pull cord may assume the form of a closed loop of flexible material such as a rope, cord, or beaded chain, herein referred to as a continuous cord loop, or alternatively as chain/cords.

In some instances, window covering systems have incorporated a motor that actuates the mechanism for spreading and retracting the blind or shade material, and controlling electronics. Most commonly, the motor and controlling electronics has been mounted within the headrail of the window blinds, or inside the tubes (sometimes called tubular motors), avoiding the need for pull cords such as a continuous cord loop. Using such motor-operated systems or devices, the shade or blind material can be spread or retracted by user actuation or by automated operation e.g., triggered by a switch or photocell. Such window covering systems in which the motor and controlling electronics has been mounted within the headrail are sometimes herein called an "internal motor", "internal motor device" or "internal motor system".

The drive system of the present invention incorporates a motor and controlling electronics mounted externally to the mechanism for spreading and retracting the blind or shade material. Such drive system is herein called an "external motor", "external motor device" or "external motor system", and alternatively is sometimes called an "external actuator". External motor systems are typically mounted externally on the window frame or wall and engage the cords or chains (continuous cord loop) of window coverings in order to automate opening and closing the blind.

In both internal motor systems and external motor systems (herein sometimes called collectively, motorized systems), automated drive systems incorporate controlling electronics to control operation. Commonly, motorized systems have been controlled through user control mechanisms that incorporate an RF (radio frequency) controller or other remote controller for wireless communication with a drive system associated with the motor. Such remote user control systems have taken various forms such as a handheld remote control device, a wall-mounted controller/switch, a smart-home hub, a building automation system, and a smart phone, among others. The use of such remote control devices is particularly germane to internal motor systems in which it is difficult or impossible to integrate user control devices within the internally mounted drive system.

In the external motor drive system of the present disclosure, since the external actuator is separated from the headrail or other window coverings mechanism, this opens up new possibilities for integrating user controls in the external actuator itself. These integrated control features are herein sometimes called "on-device control". On-device control of external motor systems offers various advantages, such as simplicity of operation, and convenience in accessing the control device and in executing control functions. Such on-device control of external motor systems can be integrated with automated control systems through appropriate sensors, distributed intelligence, and network communications.

Automated control over window covering systems can provide various useful control functions. Examples of such automated window control functions include calibrating the opening and closing of blinds to meet the preferences of users, and controlling multiple blinds in a coordinated or centralized fashion. There is a need effectively to integrate various automated window control functions in on-device control for external actuators.

SUMMARY

The embodiments described herein include a motor drive system for operating a mechanism for raising and lowering window coverings. The motor drive system includes a motor operating under electrical power and a drive assembly. The motor drive system advances a continuous cord loop in response to positional commands from a controller. An input-output device for the controller includes an input interface that receives user inputs along an input axis, and a visual display aligned with the input axis of the input interface. In an embodiment, the input-output device includes a capacitive touch strip that receives user inputs along an input axis, and an LEDs strip aligned with the input axis.

In an embodiment, the input-output device extends vertically on the exterior of a housing for the motor drive system, and the housing supports input buttons. In an embodiment, buttons on the housing include a group mode module and a set control module. In another embodiment, the housing supports an R/F communication button.

In an embodiment, a group mode module communicates the positional commands to other motor drive systems within an identified group to operate respective other mechanisms of the other motor drive systems. In an embodiment, the group mode module causes an RF communication module to communicate the positional commands to other motor drive systems. In an embodiment, the other motor drive systems within the identified group operate the respective other mechanisms in accordance with a calibration of a respective top position and a respective bottom position for each of the other motor drive systems.

In an embodiment, a set control module enables user calibration of a top position and a bottom position of travel of the window covering. In an embodiment, during calibration the user moves the window covering respectively to the top position and the bottom position with the input interface, and presses a set button to set these positions.

In an embodiment, the drive assembly comprises a driven wheel configured for engaging and advancing the continuous cord loop coupled to the mechanism for raising and lowering the window covering, and an electrically powered coupling mechanism coupling the driven wheel to the output shaft of the motor and configured for rotating the driven wheel in first and second senses. Rotation of the driven wheel in a first sense advances the continuous cord loop in the first direction, and rotation of the driven wheel in a second sense advances the continuous cord loop in the second direction. The controller provides the positional commands to the motor and the electrically powered coupling mechanism to control the rotation of the driven wheel in the first and second senses.

In an embodiment, a motor drive system comprises a motor configured to operate under electrical power to rotate an output shaft of the motor, wherein the motor is external to a mechanism for raising and lowering a window covering; a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering; a controller for providing positional commands to the motor and the drive assembly to control the advancing the continuous cord loop in the first direction and the advancing the continuous cord loop in the second direction; and an input-output device for the controller, including an input interface that receives user inputs along an input axis to cause the controller to provide the positional commands to the motor and the drive assembly, and further including a visual display aligned with the input axis of the input interface.

In an embodiment, a motor drive system, comprises a first motor configured to operate under electrical power to rotate an output shaft of the motor, wherein the first motor is external to a first mechanism for raising and lowering a window covering; a drive system configured for engaging and advancing a continuous cord loop coupled to the first mechanism for raising and lowering the window covering, wherein advancing the continuous cord loop in a first direction raises the window covering, and advancing the continuous cord loop in a second direction lowers the window covering; a controller for providing positional commands to the first motor and the first electrically powered drive system to control the advancing the continuous cord loop in the first direction and the advancing the continuous cord loop in the second direction; an RF communication module operatively coupled to the controller for controlling RF communication of the positional commands to a network of other motor drive systems for operating respective other mechanisms for raising and lowering respective other window coverings; and a group mode module, for identifying one or more of the other motor drive systems included in a user-selected group, and for causing the RF communication module to communicate the positional commands to the identified one or more of the other motor drive In an embodiment, a motor drive system comprises a motor configured to operate under electrical power to rotate an output shaft of the motor, wherein the motor is external to a mechanism for raising and lowering a window covering; a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering; a controller for providing positional commands to the motor and the drive assembly to control the advancing the continuous cord loop in the first direction and the advancing the continuous cord loop in the second direction to control the raising and lowering the window covering; and a set control module for user calibration of a top position and a bottom position of the window covering, wherein following the user calibration the controller limits the raising and lowering the window covering between the top position and the bottom position.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
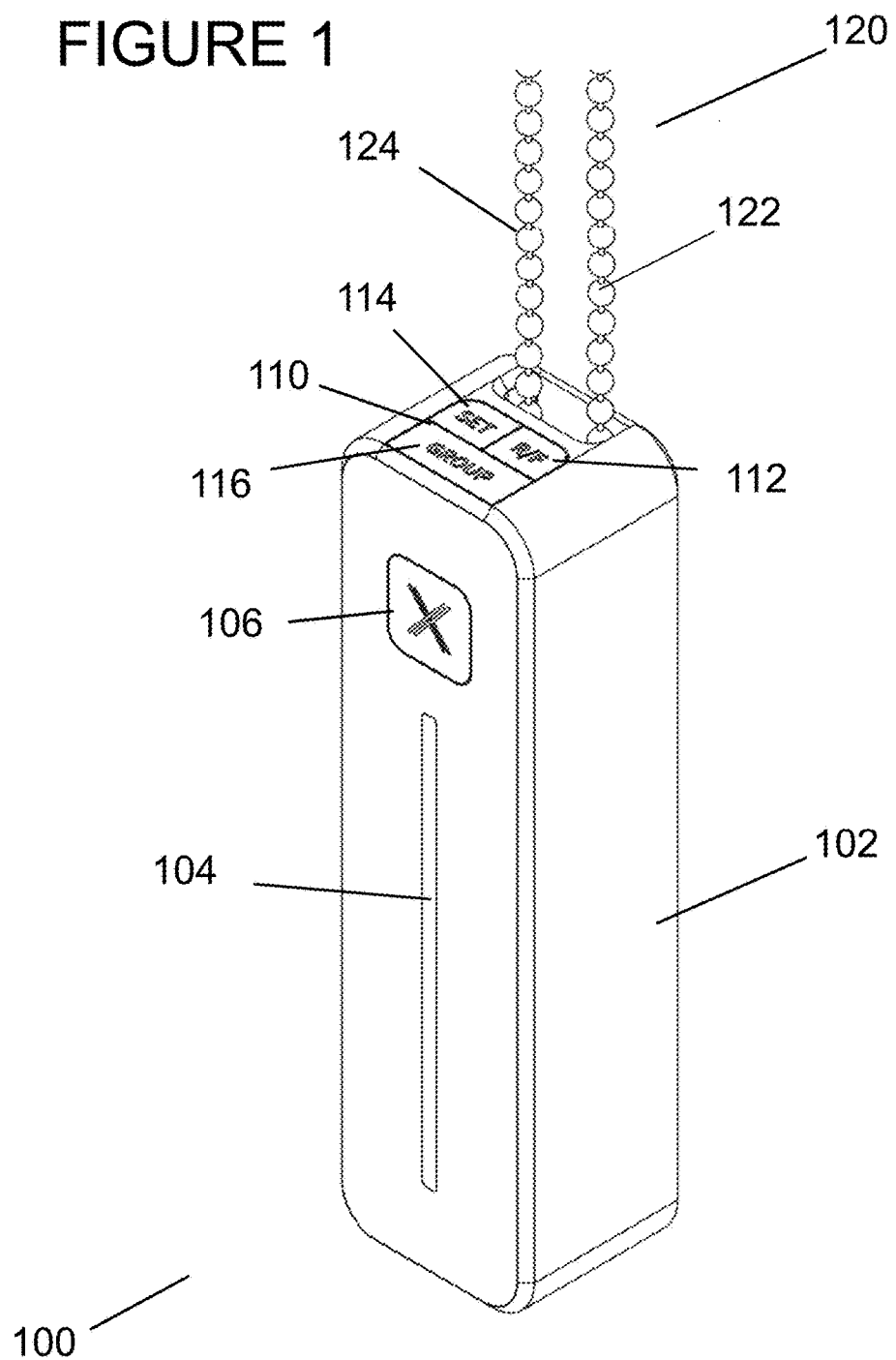
FIG. 1 is an isometric view of an external motor device.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The present disclosure describes various embodiments of an external motor device with on-device control, for controlling the operation of a window covering system. As used in the present disclosure, a "window covering system" is a system for spreading and retracting or raising and lowering a window covering. In an embodiment as shown at 200 in FIG. 5, the window covering system includes a headrail 202, and a mechanism (not shown) associated with the headrail (i.e., a mechanism within the headrail or adjacent the headrail) for spreading and retracting a window covering. In this embodiment, the window covering system 200 includes a continuous cord loop 220 extending below the headrail for actuating the mechanism associated with the headrail, to spread and retract the window covering. As used in the present disclosure, "headrail" is a broad term for a structure of a window covering system including a mechanism for spreading and retracting the window covering. The window covering system further includes an external motor 210. Continuous cord loop 220 operatively couples the window covering mechanism associated with headrail 202 to the external motor 210 to raise and lower a window shade (fabric, or blind) 204. As seen in FIG. 6, external motor 210 is mounted to the wall 206 adjacent to the window, which is covered by shade 204 in this view. For example, external actuator may be mounted to wall 206 using hardware such as bolts 214, or using a mounting fixture such as bracket 194 in FIG. 2.

In the present disclosure, "window covering" includes any covering material that may be spread and retracted to cover a window or other architectural opening using a continuous cord loop system (i.e., system with a mechanism for spreading and retracting the window covering using a continuous cord loop). Such windows coverings include most shades and blinds as well as other covering materials, such as: roller shades; honeycomb shades; horizontal sheer shades, pleated shades, woven wood shades, Roman shades, Venetian blinds, Pirouette® shades (Pirouette is a trademark of Hunter Douglas N.V., Rotterdam, Germany), and certain systems for opening and closing curtains and drapery. Window covering embodiments described herein refer to blind or blinds, it being understood that these embodiments are illustrative of other forms of window coverings.

As used in the present disclosure, a "continuous cord loop" is an endless loop of flexible material, such as a rope, cord, beaded chain and ball chain. Continuous cord loops in the form of loops of cord are available in various types and ranges of diameter including for example D-30 (1⅛"-1¼"), C-30 (1³⁄₁₆"-1⁷⁄₁₆"), D-40 (1³⁄₁₆"-1⁷⁄₁₆"), and K-35 (1¼"-1½"). Additionally, various types of beaded chain and ball chain are commonly used as continuous cord loops for window covering systems. A typical ball chain diameter is 5 mm (0.2 inch). In a common window covering system design, the continuous cord loop includes a first loop end at the headrail engaging a mechanism associated with the headrail for spreading and retracting the window covering, and includes a second loop end remote from the headrail. Continuous cord loops come in different cord loop lengths, i.e., the length between the first loop end and the second loop end, sometimes rounded off to the nearest foot. In one embodiment, e.g., in a roller blinds system, the continuous cord loop extends between the headrail and the second loop end, but does not extend across the headrail. In this embodiment, the first loop end may wrap around a clutch that is part of the mechanism spreading and retracting the blind. In another embodiment, e.g., in a vertical blinds system, a segment of the continuous cord loop extends across the headrail. In an embodiment, the continuous cord loop extends below the headrail in a substantially vertical orientation. When retrofitting the present external motor device to control a previously installed window coverings system, the continuous cord loop may be part of the previously installed window coverings mechanism. Alternatively, the user can retrofit a continuous cord loop to a previously installed window coverings mechanism.

The continuous cord loop system may spread and retract the window covering by raising and lowering, laterally opening and closing, or other movements that spread the window covering to cover the architectural opening and that retract the window covering to uncover the architectural opening. Embodiments described herein generally refer to raising and lowering blinds either under control of an external motor system or manually, it being understood that that these embodiments are illustrative of other motions for spreading and retracting window coverings. External actuator 210 incorporates a motor drive system and controlling electronics for automated movement of the continuous cord loop 220 in one of two directions to raise or lower the blind 204. In one embodiment of window covering system 200, the continuous cord loop 220 includes a rear cord/chain 224 and a front cord/chain 222. In this embodiment, pulling down the front cord raises (retracts) the blind, and pulling down the rear cord lowers (spreads) the blind. As used in the present disclosure, to "advance" the continuous cord loop means to move the continuous cord loop in either direction (e.g., to pull down a front cord of a continuous cord loop or to pull down a back cord of a continuous cord loop). In an embodiment, the blind automatically stops and locks in position when the continuous cord loop is released. In an embodiment, when at the bottom of the blind, the rear cord of the continuous cord loop can be used to open any vanes in the blind, while the front cord can be used to close these vanes.

Figure 5:
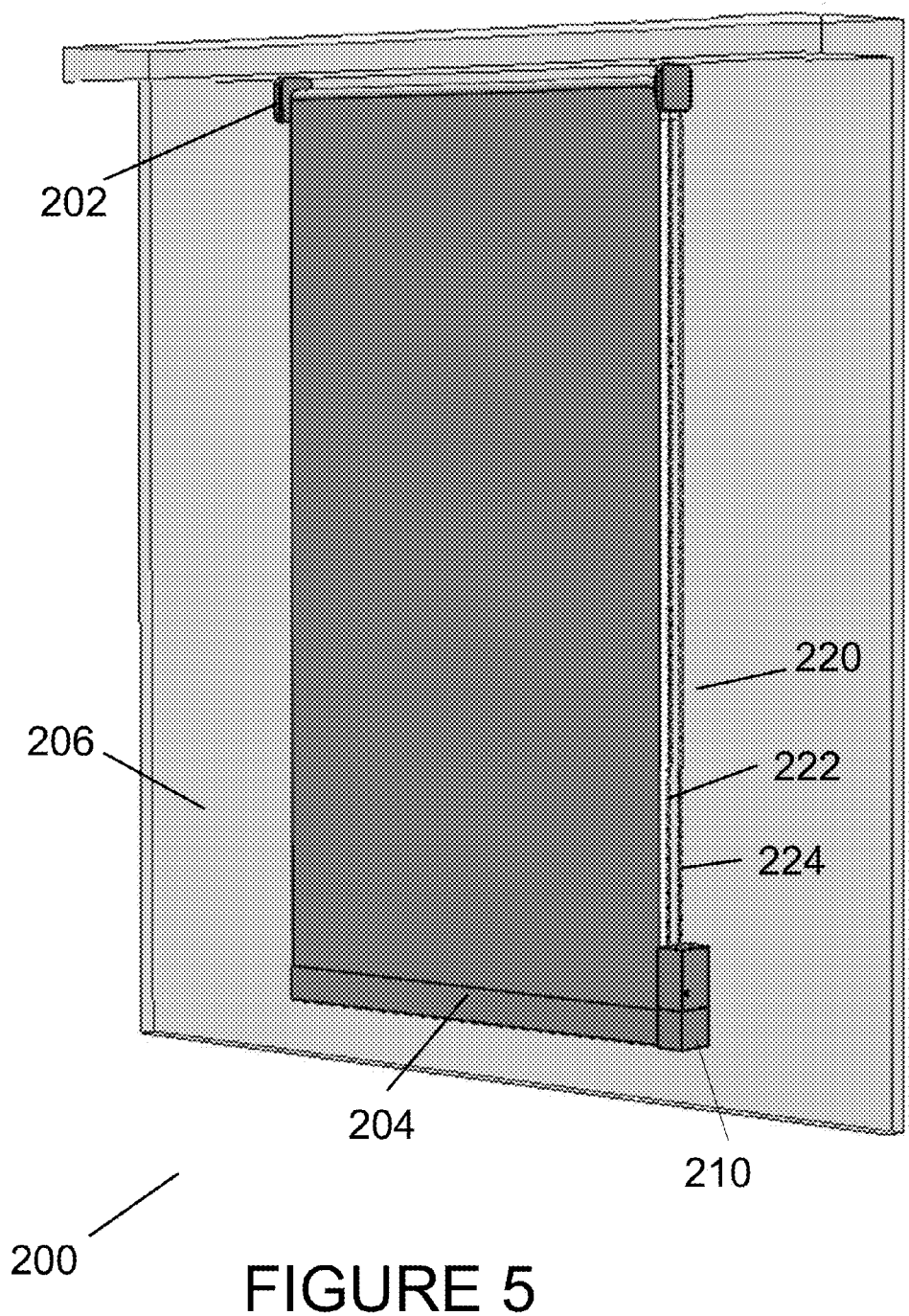
FIG. 5 is a perspective view of a window covering system with an external motor system installed on a flat wall, according to an embodiment.
Figure 6:
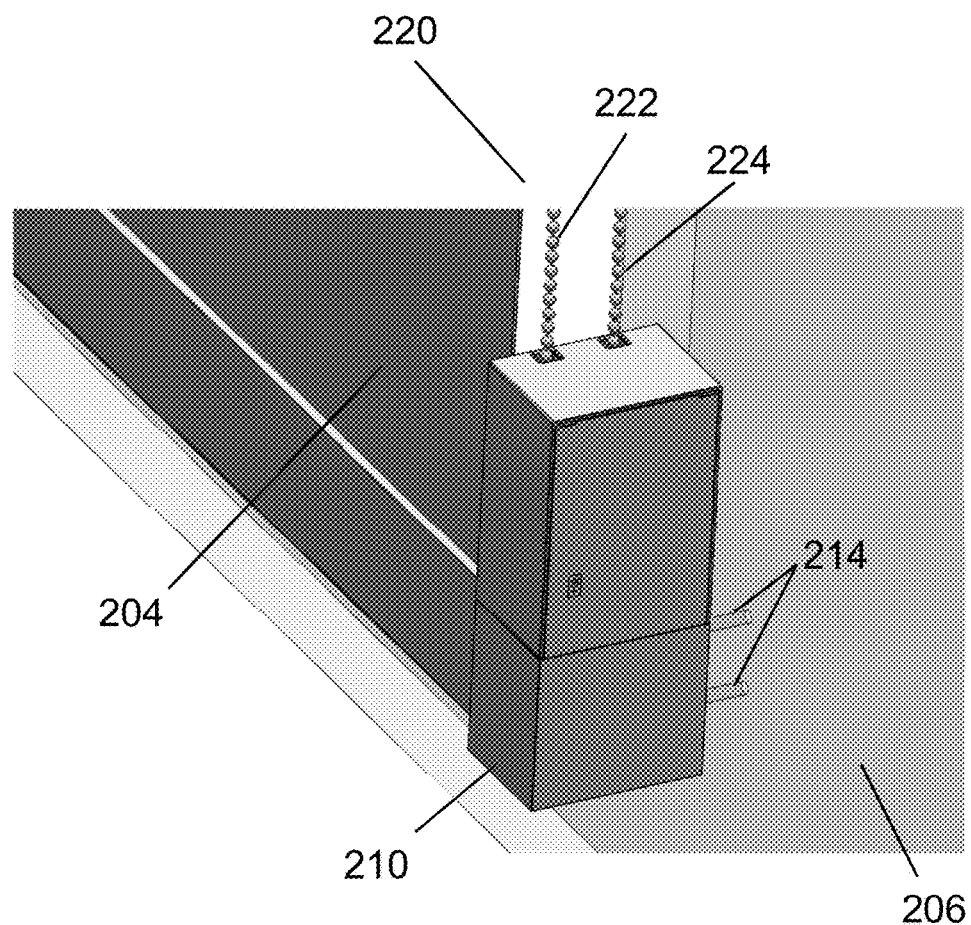
FIG. 6 is a perspective view of an installed external motor system for a window covering system, according to the embodiment of FIG. 5.

As seen in the isometric view of FIG. 1, an external motor 100 generally corresponding to the external motor 210 of FIGS. 5, 6 may include a housing 102 that houses a motor, associated drive mechanisms, and control electronics. External actuator 100 includes various on-device controls for user inputs and outputs. For example, external actuator 100 may include a touch strip 104 (also called slider or LED strip). In the illustrated embodiment, touch strip 104 includes a one-axis input device and a one-axis visual display. External actuator 100 further includes various button inputs including power button 106 at the front of the housing, and a set of control buttons 110 at the top of the housing. In an embodiment, control buttons 110 include an R/F button 112, a Set button 114, and a Group button 116. In an embodiment, buttons 106, 110 are physical (moveable) buttons. The buttons may be recessed within housing 102 or may project above the surface of housing 102. In lieu of or in addition to the touch strip and the physical buttons seen in FIG. 1, the input controls may include any suitable input mechanism capable of making an electrical contact closure in an electrical circuit, or breaking an electrical circuit, or changing the resistance or capacitance of an electrical circuit, or causing other state change of an electrical circuit or an electronic routine.

Figure 14:
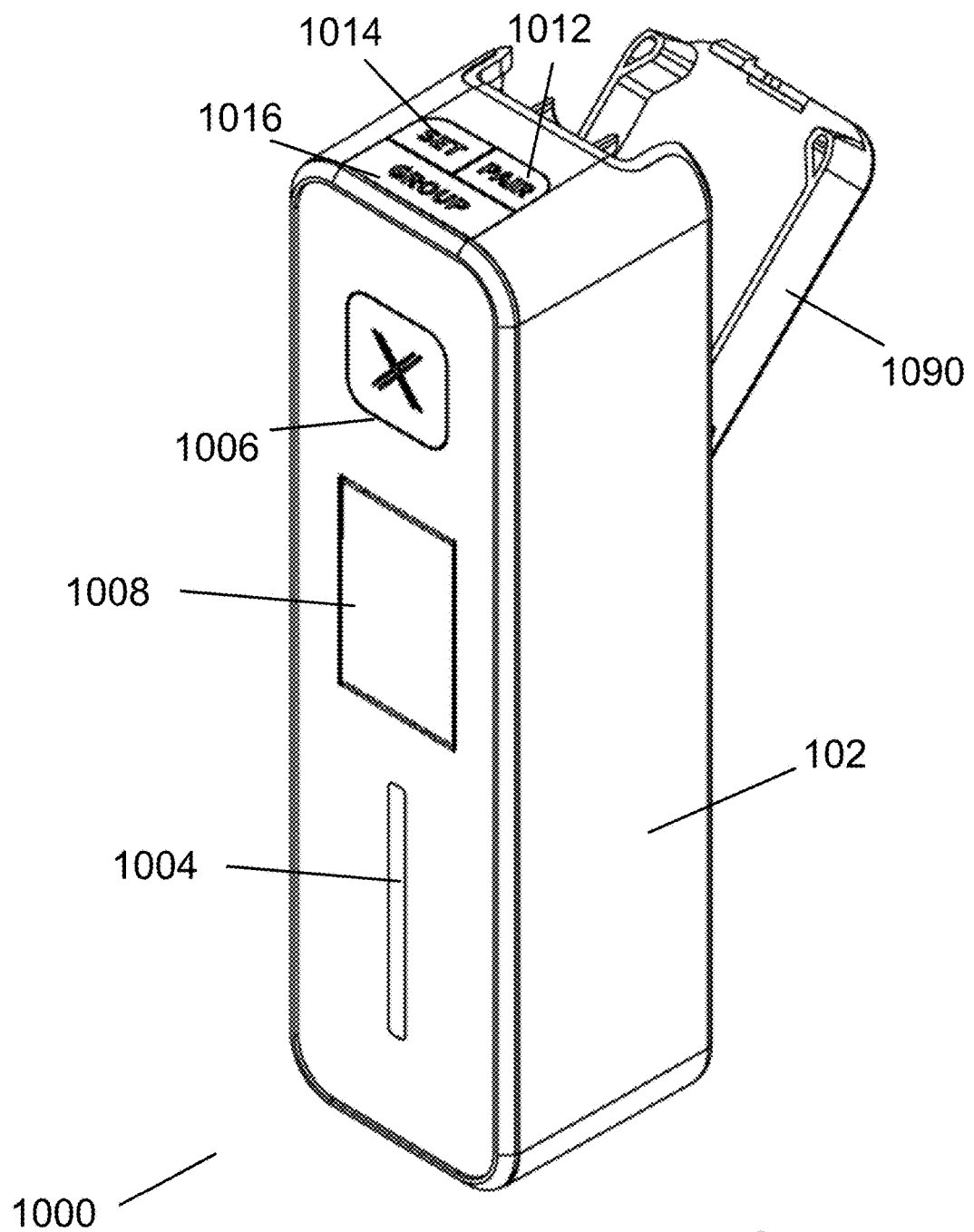
FIG. 14 is an isometric view of an external motor device, according to a further embodiment.

In various embodiments, alternative or additional input devices may be employed, such as various types of sensor (e.g., gesture sensor or other biometric sensor, accelerometer, light, temperature, touch, pressure, motion, proximity, presence, capacitive, and infrared sensors). Other user input mechanisms include touch screen buttons, holographic buttons, voice activated device, audio trigger, relay input trigger, or electronic communications trigger, among other possibilities, including combinations of these input mechanisms. FIG. 14 shows an alternative external motor 1000 that includes input devices 1004, 1006, 1012, 1014, and 1016 generally corresponding to input devices of motor 100. Additionally, the external motor 1000 includes a two-dimensional screen 1008 located on the front face of external motor 1000 above the LED strip 1004 and below the power button 1006. Two-dimensional screen 1008 may be a touch screen, and may provide various input/output functions such as a virtual keypad, an alphanumeric display, and a graphical user interface, among others.

Referring again to FIG. 1, an input interface of external motor 100 may recognize various user input gestures in generating commands for opening or closing window coverings, and other system functions. These gestures include typing-style gestures such as touching, pressing, pushing, tapping, double tapping, and two-finger tapping; gestures for tracing a pattern such as swiping, waving, and hand motion control; as well as multi-touch gestures such as pinching specific spots on the capacitive touch strip 104. In the cases of a two-dimensional user interface such as touch screen 1008 of FIG. 14, additional user gestures may employed such as multi-touch rotation, and two dimensional pattern tracing.

The on-device controls of the present external motors incorporate a shade positional control input-output (I/O) device such as slider 104. Slider 104 extends vertically on housing 102 along an input axis of the I/O device. The verticality of slider 104 naturally corresponds to physical attributes of shade positioning in mapping given inputs to shade control functions in a command generator, providing intuitive and user-friendly control functions. Examples of shade control I/O positional functionality via slider 104 include, among others:

(a) A gesture at a given slider position between the bottom and top of slider 104 corresponds to given absolute position (height) of the blind as measured by an encoder or other sensor;

(b) A gesture at a given position between the bottom and top of slider 104 corresponds to given relative position of the blind relative to a calibrated distance between a set bottom position and a set top position (e.g., a gesture at 25% from the bottom of slider 104 corresponds to a blind position 25% of the calibrated distance from the set bottom position to the set top position);

(c) Gestures at the top and bottom of the slider 104 can execute different shade control functions depending on the gesture. Pressing and holding the top of the slider 104 is a command for the blind to move continuously upward, while pressing and holding the bottom of the slider 104 is a command for the blind to move continuously downward. Tapping the top of the slider 104 is a command for the blind to move to its top position, while tapping the bottom of the slider 104 is a command for the blind to move to its bottom position.

(d) Upward and downward dynamic gestures (e.g., swiping) on slider 104 can be assigned different functions such as "up" and "down," or "start" and "stop."

Slider 104 provides a versatile input-output device that is well suited to various control functions of a window coverings motor drive system. Various shade control functions may be based on a one-axis quantitative scheme associated with the touch strip 104, such as a percentage scale with 0% at the bottom of the touch strip and 100% at the top of the touch strip 104. For example, the slider 104 can be used to set blind position at various openness levels, such as openness levels 0% open (or closed), 25% open, 50% open, 75% open or 100% (fully) open, via pre-set control options. A user can command these openness levels via slider 104 by swiping, tapping, or pressing various points on the slider. In addition, the slider command scheme can incorporate boundary positions for state changes. For example, a slider input below the one-quarter position of the slider can command the window covering to close from 25% open to 0% open.

Various functions of slider 104 may employ a combination of the one-axis input sensing and one-axis display features of the slider. For example, the LEDs strip 140 can illuminate certain positions along the touch strip 104, with these illuminated positions corresponding to boundaries along the slider for state changes in a shade command structure.

Similar principles can be applied to other types of shade positional control input-output (I/O) device, such as a two-dimensional touch screen 1008, gesture sensors, directional buttons, etc. For example, a two-dimensional input interface 1008 can include a one-axis control that receives user inputs along an input axis.

The mapping of given user gestures to given shade control commands, herein also called "positional commands," can distinguish between commands applicable only to the local external motor 100, versus commands applicable to multiple external motors. In an example, double tapping the top of a capacitive touch slider design commands the system to provide 100% openness for all windows coverings in a pre-set group of window blinds, rather than just the local blind. In another example, two-finger tapping commands the system to open all the window coverings connected within the network.

Figure 2:
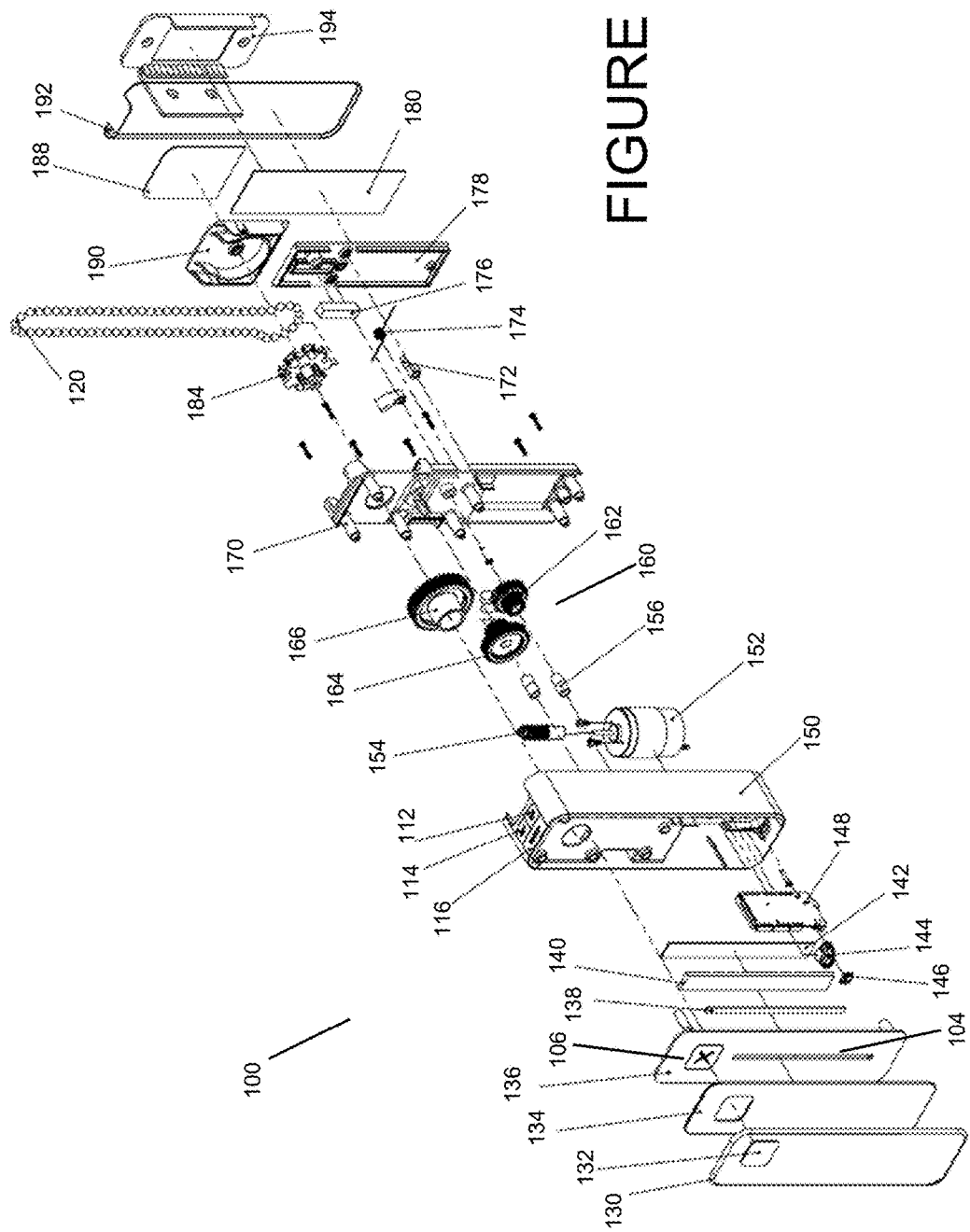
FIG. 2 is an exploded view of disassembled components of an external motor device, according to the embodiment of FIG. 1.
Figure 3:
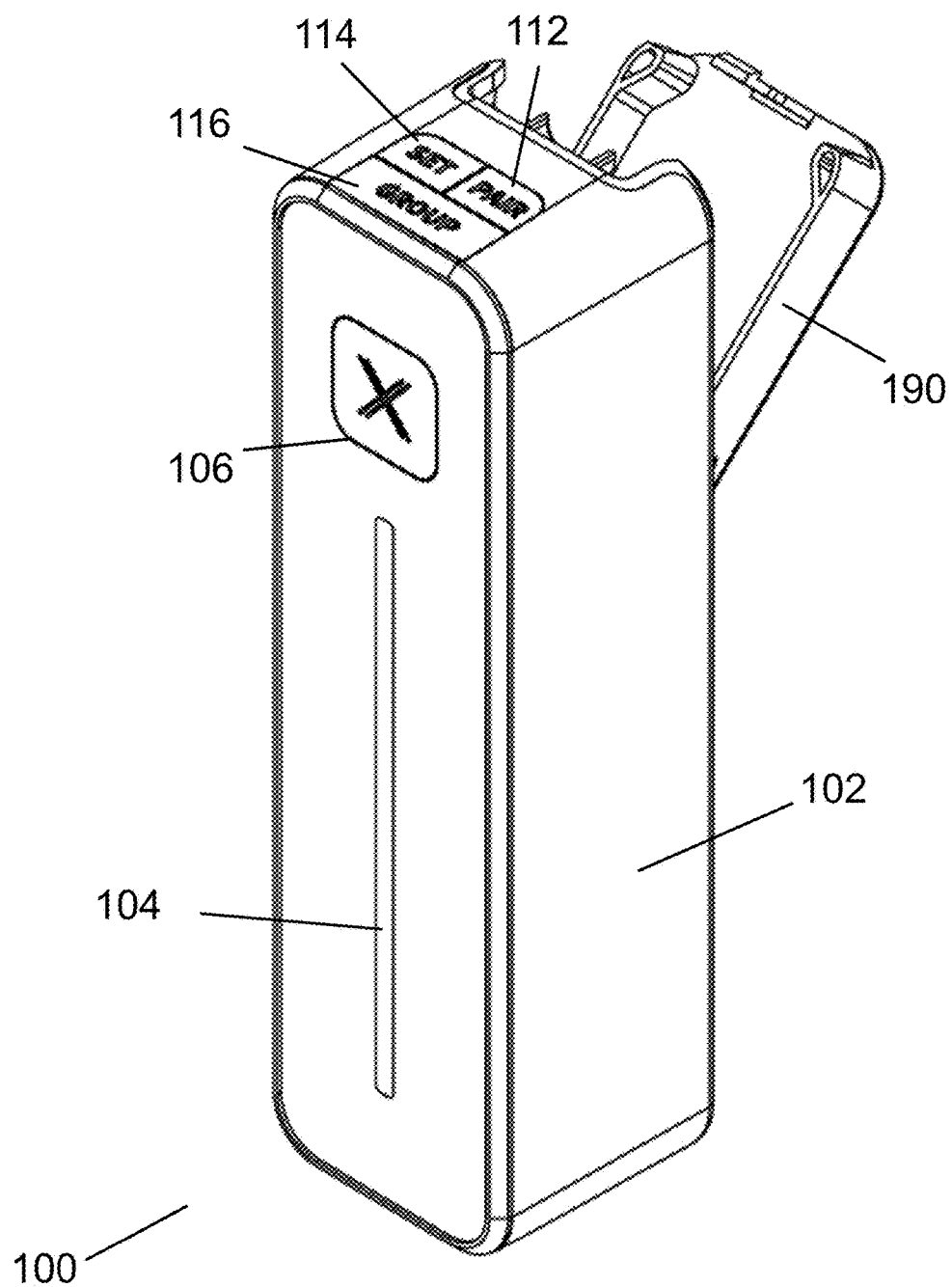
FIG. 3 is an isometric view of an external motor device with sprocket cover in an opened position, according to an embodiment.
Figure 4:
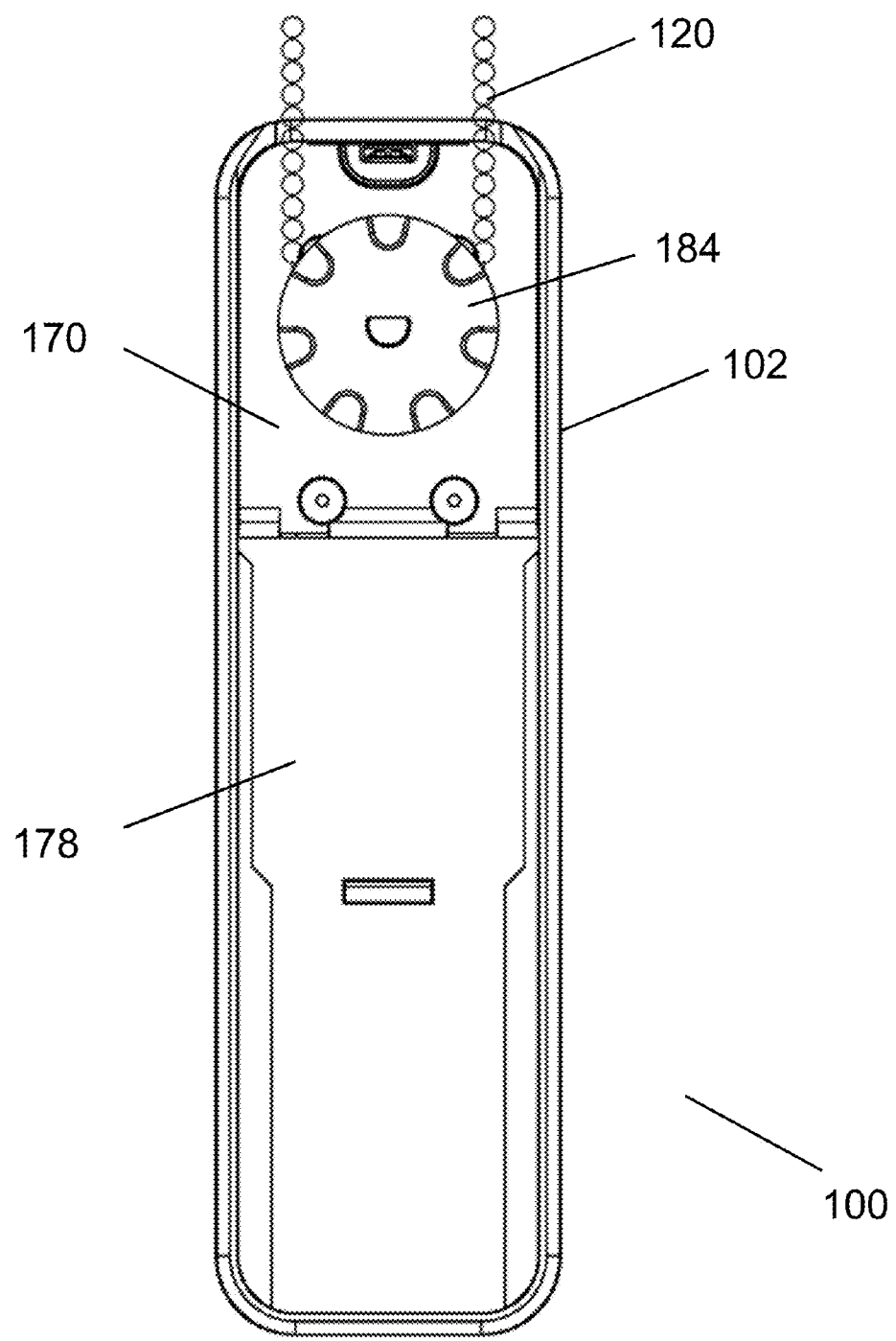
FIG. 4 is an elevational view of an external motor device as seen from the rear, in a section taken through the sprocket, according to the embodiment of FIG. 1.

FIG. 2 is an exploded view of the components of the external actuator 100. Starting with the components at the front of the device at lower left, a front bezel 130 includes a power button glass plate that covers the power button 106. A front lid glass plate 134 includes an aperture for the power button. Front lid 136 houses the power button 106 and serves as a transparent cover plate for the touch strip 104. Visual display components of the one-axis strip 104 include LEDs strip (also called LEDs) 140 and diffuser 138. The input sensor for one-axis strip 104 is a capacitive touch sensor strip 142. These components serve as an input-output device for the external motor 100, including an input interface that receives user inputs along an input axis, and a visual display aligned with the input axis. When fully assembled, the input-output device extends vertically on the exterior of the housing 102.

Other input/output components include a connector for communications and/or power transfer such as a USB port 146, and a speaker (audio output device) 144. The LEDs and audio outputs of external motor 100 can be used by state machines of external motor 100 to provide visual and/or audio cues to signal an action to be taken or to acknowledge a state change. Visual cue parameters of the LEDs 140 include, for example: (a) different positions of LED indicators (blocks of LEDs) along slider 104; (b) different RGB color values of LED lights; and (c) steady or flashing LED indicators (including different rates of flashing).

In examples of visual cues involving the group mode function. In an embodiment, the user can press Group Mode button 116 once to cause external motor devices in the network to light up their LEDs display, informing the user which devices will be controlled. When a user successfully presses the Group Mode 116 button to program external motor 100 to control multiple external motors in its network, the LEDs strip 140 of all external motors being controlled will change color from steady blue to steady green.

In examples of visual cues involving the Set function, when a user initiates the calibration procedure by pressing and holding the Set button, the LEDs strip 140 will change to red and blue to inform the user that the external motor 100 is in calibration mode. When the user successfully completes the calibration procedure, the LEDs strip 140 will flash green to indicate that the shade is now calibrated.

In a visual cue example involving setting position, when a user taps a finger at a particular position along the capacitive touch strip 104, the LEDs strip 140 illuminates a block of LEDs at this last known position. This indicator informs the user of the position to which the shade will open or close.

In an example of audio cues, an audio alarm sounds to signal a safety issue. In a further example, the speaker 144 broadcasts directions to the user for a shade control function.

Motor drive components are housed between the main body 150 of housing 102 and a back lid 170. The motor components include motor 152 (e.g., a 6V DC motor), and various components of a drive assembly. Components of the drive assembly include a worm gear 154 that is driven by the motor rotation and coupled to a multi-stage gear assembly 160, and a clutch (not shown in FIG. 2). Gear assembly 160 includes helical gear 162 (first-stage gear), a first spur gear 164 (second-stage gear) rotatably mounted on sleeve bearings 156, and a second spur gear 166 (third-stage gear). Printed circuit board 148 houses control electronics for the external motor device 100.

Spur gear 166 is coupled via a clutch (not shown) to a sprocket 184, also called driven wheel, mounted at the rear of back lid 170. Continuous cord loop (chain) 120 is threaded onto sprocket 184 so that the motion of the drive components, if coupled to the driven wheel 184 by a clutch, advances the continuous cord loop 120.

The drive assembly is configured for engaging and advancing the continuous cord loop coupled to a mechanism for raising and lowering the window covering. The drive assembly includes driven wheel 184 and a coupling mechanism (152, 160, clutch) coupling the driven wheel 184 to the output shaft of the motor. The coupling mechanism is configured for rotating the driven wheel 184 in first and second senses. Rotation of the driven wheel in a first sense advances the continuous cord loop in the first direction, and rotation of the driven wheel in a second sense advances the continuous cord loop in the second direction.

Structural components at the back of external motor 100 includes a back lid cover 178, sprocket cover 190, back lid glass plate 180, and sprocket lid glass plate 188. These components are covered by back bezel 192, which is coupled to a bracket 194 that serves as a mounting fixture for the external motor 100.

Figure 9:
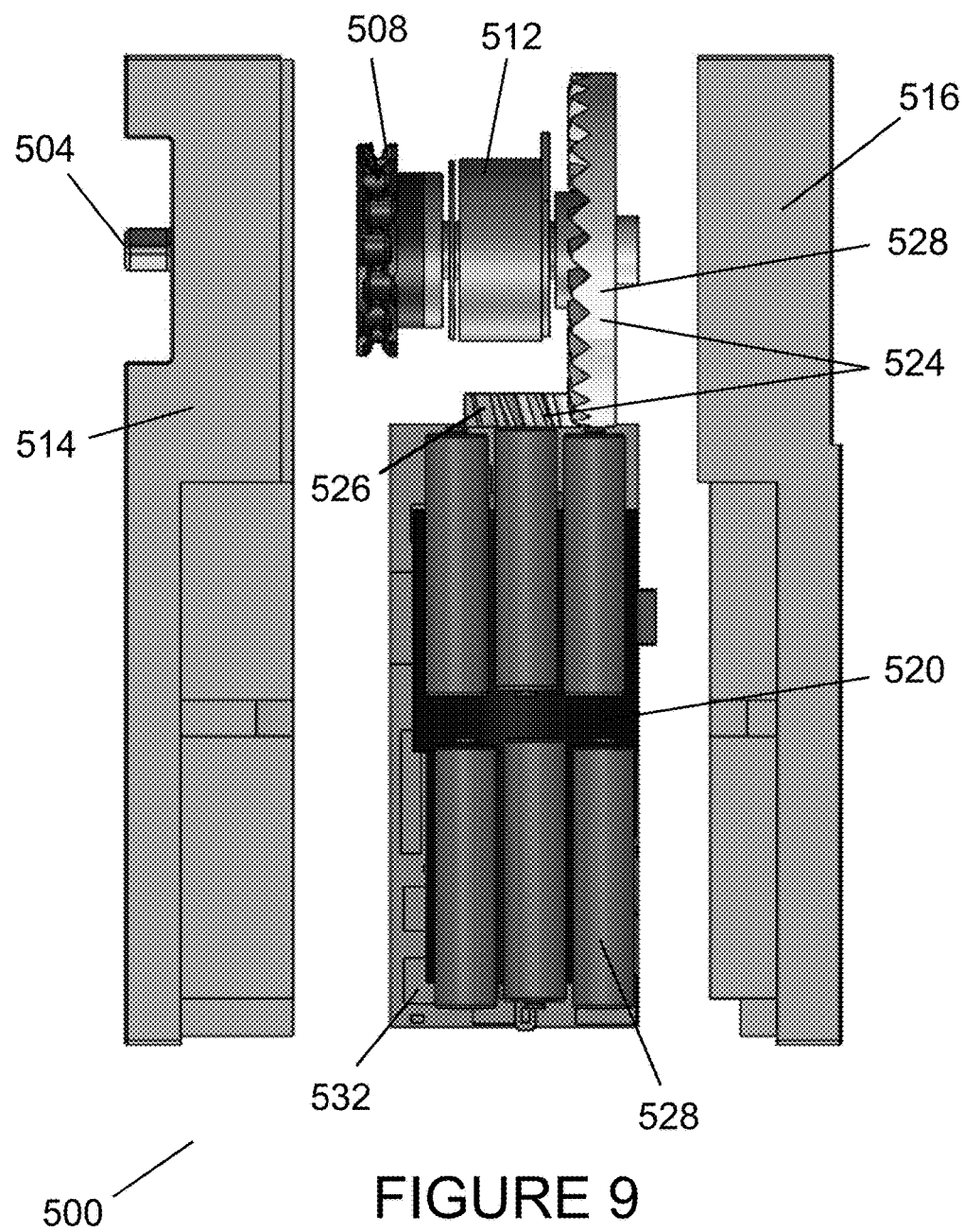
FIG. 9 is an elevation view of disassembled motor drive components for an external motor system, according to the embodiment of FIG. 1.

FIG. 9 is an elevation view of structural components and assembled working components from a motor drive subassembly 500, as seen from one side. Front housing 514 and rear housing 516 envelop the drive train and other operational components of drive system 500, but are here shown separated from these components. DC motor 520, under power and control from printed circuit board 532 and battery pack 528, has a rotating output shaft. Batteries 528 may for example be nickel-metal hydride (NiMH) batteries, or lithium-ion polymer (LiPo) batteries. Battery pack 528 can be located within the front housing 514 and rear housing 516 as shown, or can be external to these housings. A multi-stage gear assembly 524 includes a gear 526 in line with the motor output shaft, and a face gear 528. The face gear 528 is coupled to driven wheel 508 by clutch system 512. Clutch 512 is a coupling mechanism that includes an engaged configuration in which rotation of the output shaft of the motor 520 (as transmitted by the multi-stage gear assembly) causes rotation of the driven wheel 508; and a disengaged configuration in which the driven wheel 508 is not rotated by the output shaft of the motor. In an embodiment, clutch 512 is an electrically operated device that transmits torque mechanically, such as an electromagnetic clutch or a solenoid. In another embodiment, clutch 512 is a two-way mechanical-only clutch that does not operate under electrical power.

Successive presses of the power button 504 toggle the drive assembly between engaged and disengaged configurations of the clutch system 512. Power button 504 corresponds to power button 106 in the external actuator embodiment 100 of FIGS. 1 and 2. In an embodiment, Power Button 106 turns on or off the device by engaging and disengaging the driven wheel or sprocket 508 respectively with the clutch system 512. In another embodiment, pressing the Power Button 106 triggers power-on and power-off of the external actuator 100.

In one embodiment utilizing a two-way mechanical-only clutch, when power button 106 is pressed in an 'on' position, the mechanical clutch will engage the driven wheel with the motor's output shaft and gear assembly. This is a tensioned position in which the mechanical clutch will not allow the driven wheel to be operated by manually pulling or tugging on the front chain/cords 122 or back chain/cords 124. In this engaged configuration, when the external motor 100 receives a shade control command from the on-device controls or another device, it will energize the motor to turn the output shaft and gear, which in turn will turn the driven wheel. When the power button 106 is pressed in an 'off' position, the mechanical clutch will disengage the driven wheel from the output shaft and gear, allowing for manual operation of the front chain/cords 122 or back chain/cords 124. In the disengaged configuration, if a shade control command is sent when the clutch is not engaged, the driven wheel will not turn.

In another embodiment, the clutch system is an electromagnetic clutch in which the driven wheel is always engaged with the output shaft and gear assembly. The electromagnetic clutch allows for manually operation of the front chain/cords 222 or back chain/cords 224. This clutch does not lock the driven wheel to the output shaft and gears, but when electrically energised will engage the driven wheel and output shaft and gears. In a further embodiment, when external motor 100 is turned 'on' or engaged with the driven wheel via the Power Button 106, the system will recognize user tugging on the front chain/cords or the back chain/cords. In one embodiment, when a user tugs on the front chain/cord 122 while the external motor is tensioned, the LEDs associated with the touch strip 104 will flash to notify the user that she can control the device with the capacitive touch strip instead.

In another embodiment, when the external motor is turned 'on' or engaged with the driven wheel via the Power Button 106 and a user tugs on the while the drive assembly is tensioned, external actuator 100 will recognize the user's action using sensors and/or encoders, and automatically lower or raise the blinds or take other action based on a command associated with the particular tugging action. The actions mentioned can include tugging on the front chain/cord 122 or the back chain/cord 124.

In an embodiment, a sensor and/or encoder of external motor 100 measures the manual movement of the cords via a "tugging" or pulling action of the cord by a user. Mechanical coupling of the sprocket 184 to the gear assembly 160 includes a certain amount of slack, such that user's tugging on the continuous cord loop 120 will cause a certain amount of movement of the sprocket and this movement will be recognized by a sensor or encoder (e.g., encoder 322, FIG. 7). Based upon the sensor or encoder output, a shade control command structure can include various shade control actions, and engage the motor to execute a given action. Tugging the cord while the external motor 100 is engaged and opening or closing the blind can send various commands, such as stopping the blind from opening/closing.

Examples of tug actions engaging the motor to execute shade control commands:

(a) Downward tugging sensed, engaging the DC motor in the same direction. For example, if the user tugs down the front chain/cords 122, the motor would operate and lower the window shade;

(b) Downward tugging sensed, disengaging the DC motor. For example, if the user tugs down the back chain/cords 124 while the motor is raising or lowering the window shade, the motor will disengage and stop the shade at that position.

(c) Downward tugging sensed, engaging the DC motor in an opposite direction. For example, if the user tugs down the back chain/cords 124, the motor will operating and raise the window shade.

Referring again to FIG. 1, The R/F button 112 is used to pair or sync the external motor to a mobile phone via radio-frequency chips (RF) including, but not limited to BLE (Bluetooth Low Energy), WIFI or other RF chips. The R/F button 112 can be used to pair or sync to third party devices such smart thermostats, HVAC systems, or other smart-home devices by means of forming a mesh network utilizing RF chips including various protocols. Protocols include but are not limited to BLE (Bluetooth Low Energy) mesh; ZigBee (e.g., ZigBee HA 1.2); Z-Wave, WiFi, and Thread.

Figure 12:
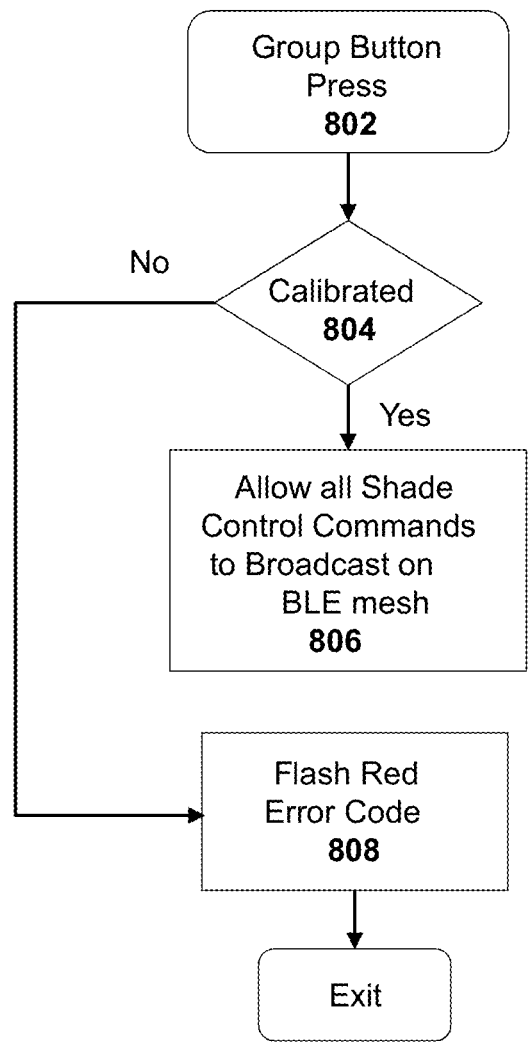
FIG. 12 is a flow chart diagram of a group mode routine, according to an embodiment.
Figure 13:
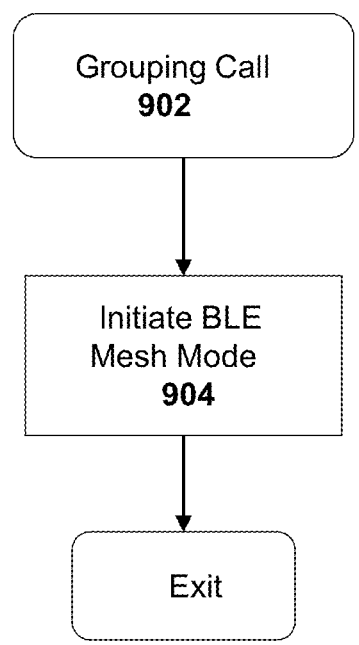
FIG. 13 is a flow chart diagram of a grouping mesh routine, according to an embodiment.

FIG. 13 is a flow chart diagram of a Grouping Mesh routine executed by an external motor in response to a grouping call received at 902. For example, a grouping call may be triggered at 806 in the Group Mode routine of FIG. 12. Upon receiving the grouping call, the external motor initiates BLE mesh mode, thereby communicating messages to other external motors in the group (BLE mesh) using a Bluetooth Low Energy protocol. For external motor networks that that use another protocol 330 (FIG. 7) for RF communications, such as ZigBee, Z-Wave, WiFi, or Thread, the grouping call routine would be modified at 804 to initiate communications with other external motors in the group based upon the applicable protocol.

The Set button 114 is used for calibrating or pre-setting the maximum opening and closed position of the blind. After the user mounts/installs the external motor 100, the user can calibrate the device to manually set positions at which the blind is fully opened or fully closed. The user then presses the top portion of the capacitive touch slider 104 to raise the blinds all the way up. When the blind has reached the top position, the user again presses the Set button 114 to save the top position. The user then presses the bottom position of the capacitive touch slider control 104 to lower the blinds. When the blind has reached its bottom position, the user again presses the Set button to save the bottom position. The top and bottom positions set by a user can reflect preferences of the user and may vary from one external motor to another.

Figure 10:
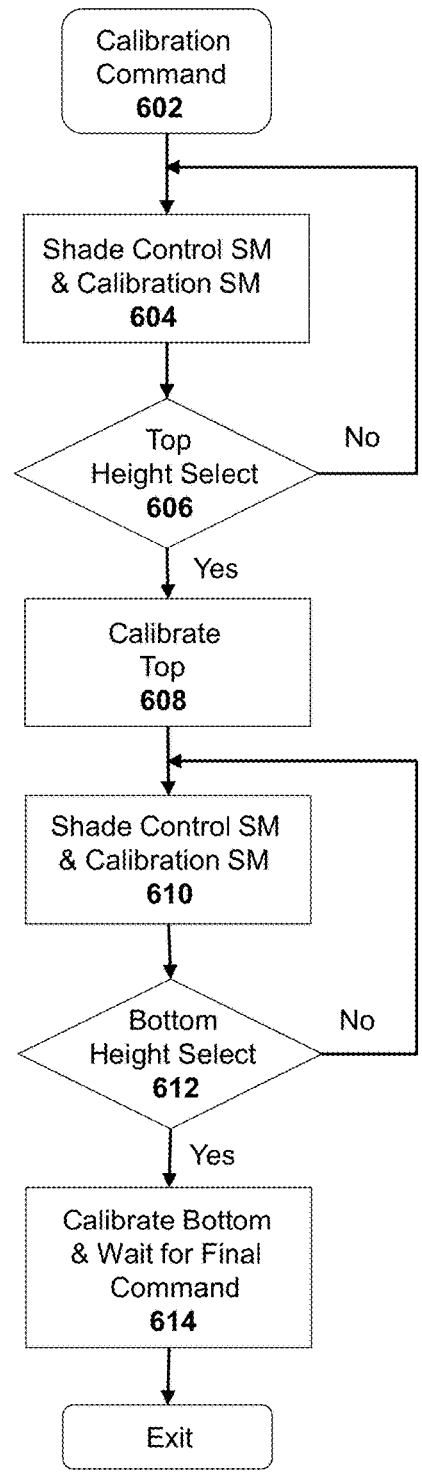
FIG. 10 is a flow chart diagram of a calibration routine for an external motor control system, according to an embodiment.

FIG. 10 is a flow chart diagram of a Calibration routine executed by an external motor 100. The calibration routine commences with a calibration command 602, which can be effected by pressing and holding the Set button 114 of an external motor, or in some other way, e.g., input at a mobile device. At 604 the system passes control to the Shade Control state machine and to the Calibration state machine. The Shade Control state machine is discussed below with reference to FIG. 11. The Calibration state machine controls the command structure for LED indicators; calculates top and bottom positions selected by the user based on encoder pulse data; saves these top and bottom positions when confirmed by the user; and calculates distance between top and bottom positions to scale shade control commands to the calibrated positions. In these routines, the user can execute various motor control commands to move the blind to a desired top position. At 606 the system detects whether the user has selected and confirmed the top position by pressing the Set button. If so, the routine saves (calibrates) the top position at 608. At 610 the system again passes control to the Shade Control state machine and to the Calibration state machine. At 621 the system detects whether the user has selected and confirmed the bottom position by pressing the Set button and, if so, saves (calibrates) the bottom position at 614. Upon the user's final confirmation of calibration at 614, the system exits the Calibration routine.

Figure 11:
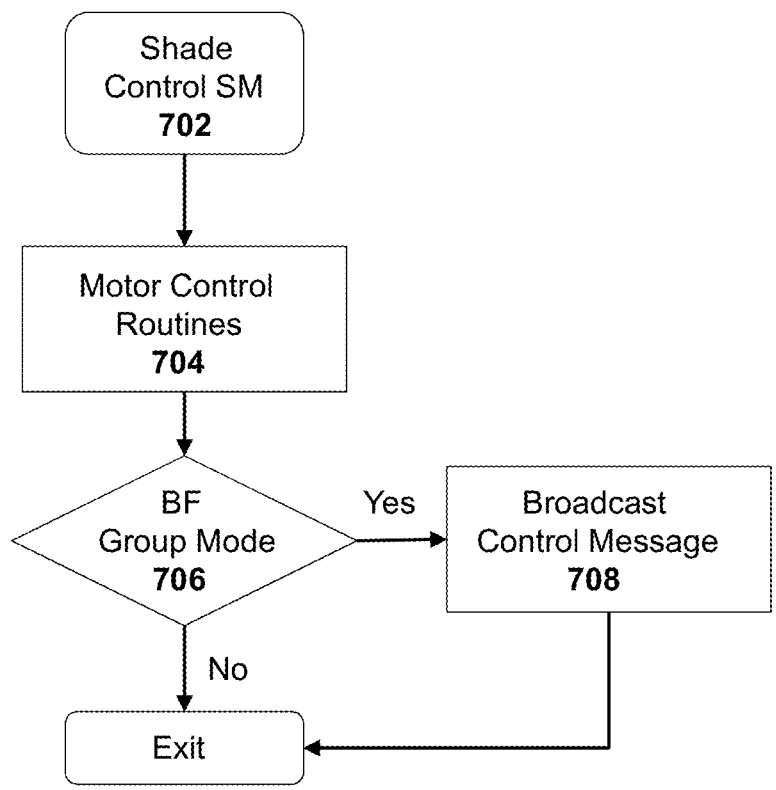
FIG. 11 is a flow chart diagram of a shade control routine, according to an embodiment.

FIG. 11 is a flow chart diagram of a Shade Control routine executed by an external motor 100. At 702 the system receives a command to pass control to the Shade Control state machine. At 704 the system passes control to motor control routines. Motor control routines start and stop the motor; move the motor in a selected direction (up/down); move the motor to a selected position; and regulate the speed of the motor. Motor control routines are typically triggered by user commands, but can also be automated, e.g., upon sensing a condition affecting safety. At 706, the system detects whether Group Mode is active for the external motor. If yes, the external motor's control system broadcasts 708 a shade control message to other motors in the group for execution. Shade control commands executed in response to the message 708 may vary among different external motors in a group. For example, shade control commands based on calibrated positions will vary depending on the top and bottom positions calibrated for each external motor. If the Group Mode is not active, the external motor exits the shade control routine at 706; otherwise it exits the routine at 708 after broadcasting the shade control message.

In an alternative embodiment, instead of setting the top position followed by calibrating the bottom position, the calibration procedure sets the bottom position followed by setting the top position.

In another calibration embodiment, the user presses and holds the Set button 114 for a limited period of time to reverse the direction of motion. In this embodiment, if the user presses the top part of the capacitive touch slider control 104 with the intent to raise the blinds, but external motor 100 instead lowers the blind, the user can press and hold Set 114 within a specified timeframe to reverse this direction. The user then presses the top portion of the capacitive touch slider control 104 to completely raise the blinds, and then presses the Set button 114 to set the top position. The user will then press the bottom portion of the capacitive touch slider control 104 to lower the blinds, and then press the Set button 114 to set the bottom position.

In a further calibration embodiment, the user can press Set for auto-calibration, in which the external motor determines top and bottom positions via predetermined sensor measurements.

The Group button (also herein called Group Mode button) 116 adds multiple external motors 100 within a network into groups in order to control these external motors simultaneously. In one embodiment, Group Mode allow a user to control all external motors within the group from one external motor 100. In an embodiment, to add additional external motors into a group, the user presses and holds the Group button 116 to enter pairing mode. The LED lights of touch strip 104 will flash orange to indicate the device is in pairing mode. In one embodiment, the user presses and holds, within a specified timeframe, the Group buttons of all external motors of the network she wants to add into the group. The LEDs color will turn from orange to green for all external motors that have been added to the group to indicate that pairing is successful. In another embodiment, the user can press the Group button 116 once to remove a device that is currently in the group, so that the Group button executes a toggle function to add or subtract the external motor from the group. In an embodiment, the user presses the Set button 114 to complete the pairing and linking of the external motors in the group.

To control a group of external motors that is linked or synced together, the user can activate group control by pressing the Group button 116. In an embodiment, this changes the LEDs on the capacitive touch slider 104 to a different color. All external motors in this group will light or flash the same LED color to indicate that the external motors are now in group control mode. The user can then set the position of the blind by using the capacitive touch slider control 104 to control all linked devices.

FIG. 12 is a flow chart diagram of a Group Mode routine executed by an external motor 100. The group mode routine triggers shade control actions by other external motors within a group in response to a shade control command at the given external motor, once the user has set up the group. At 802 the routine commences upon pressing the Group button. Alternatively, the Group Mode routine may commence upon receipt of a Group Mode command from another device recognized by the external motor, such as a smartphone, smart hub, or third party device. At 804 the system determines whether the external motor has been calibrated. If the external motor has not been calibrated, the external motor's LED strip displays a flashing red error code. This notifies the user that the external motor must be calibrated before sharing shade control commands (positional commands) with other external motors in the group. If the external motor has been calibrated, the system allows all shade control commands to be broadcast to other external motors in the group on the network (e.g., BLE mesh). The system exits the Group Mode routine after flashing an error code, or after broadcasting the positional commands.

Figure 7:
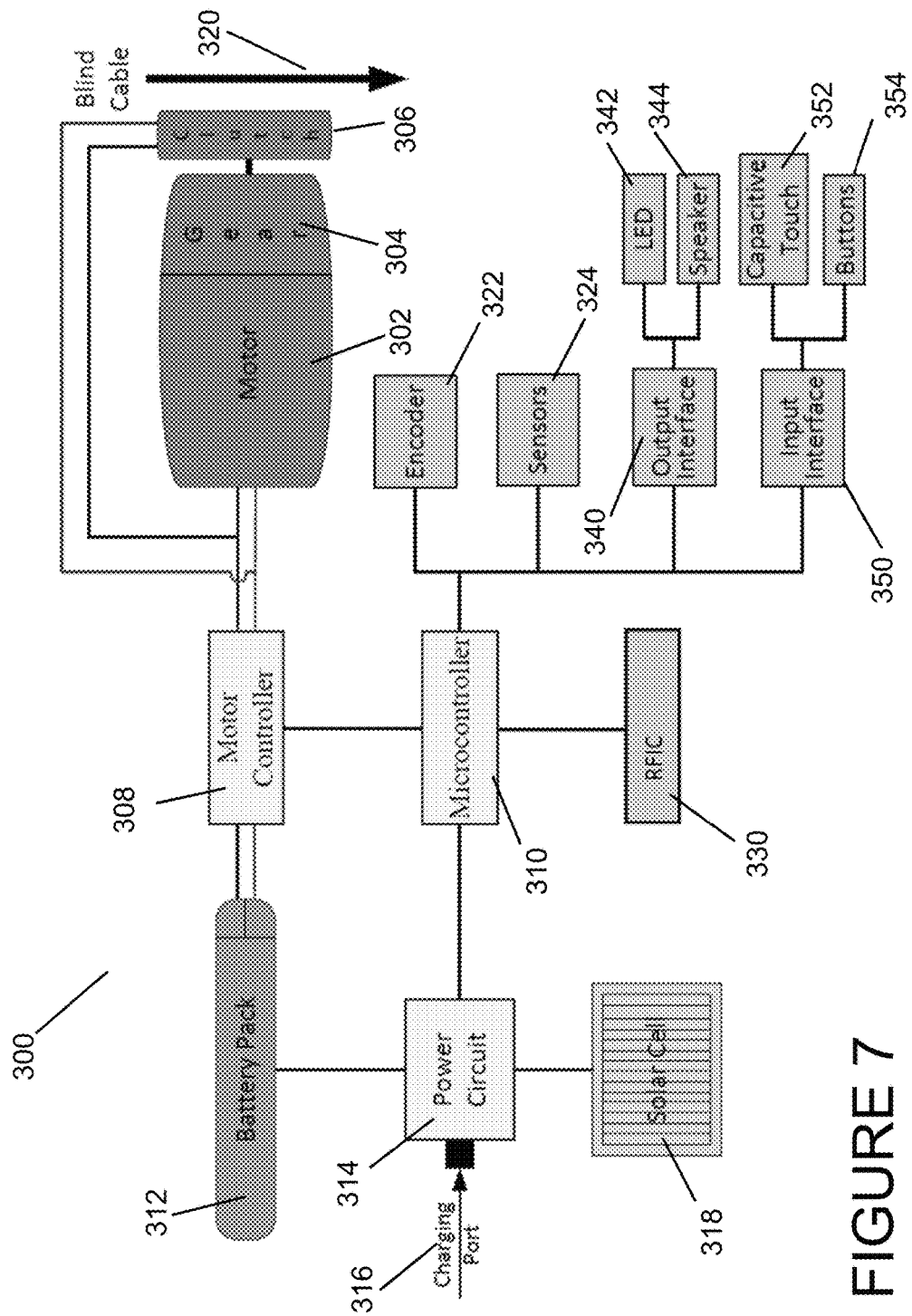
FIG. 7 is a block diagram of a control system architecture of an external motor device for a window covering system, according to an embodiment.

FIG. 7 is a diagram of a motor drive control system 300 for continuous cord loop driven window covering systems. Control system 300 includes DC motor 302, gear assembly 304, and clutch 306. DC motor 302 and clutch 306 are both electrically powered by motor controller 308. Power sources include battery pack 312. Users may recharge battery pack 312 via power circuit 314 using a charging port 316, or a solar cell array 318.

The central control element of control system 300 is microcontroller 310, which monitors and controls power circuit 314 and motor controller 308. Inputs to microcontroller 310 include motor encoder 322 and sensors 324. In an embodiment, sensors 324 include one or more temperature sensor, light sensor, and motion sensor. In an embodiment, control system 300 regulates lighting, controls room temperature, and limits glare, and controls other window covering functions such as privacy.

In an embodiment, microcontroller 310 monitors current draw from the motor controller 308, and uses this data to monitor various system conditions. For example, using current draw sensing, during calibration the control system 300 can lift relatively heavy blinds at a slower speed, and relatively lighter blinds at a faster speed. In another embodiment, microprocessor 310 monitors the current draw of the motor to determine displacements from the constant current draw as an indication of position of the window covering and its level of openness. For example, assuming the blind is fully closed (0% openness), if the current draw is at an average of 1 amp while raising the window covering, the current draw may spike to 3 amps to indicate that the fabric is rolled up and the window blind is in a fully open position (100% openness).

In another embodiment, monitored current draw measurements are analyzed to determine the direction of the driven wheel, and thereby to determine the direction in which the window blind is opening or closing. In an example, the external motor drive rotates the driven wheel one way, then the opposite way, while monitoring current draw. The direction that produces the larger current draw indicates the direction in which the blind is opening. This method assumes that more torque (and greater current draw) is needed to open a window, and less torque (and lower current draw) is needed to close a window.

In addition, microcontroller 310 may have wireless network communication with various RF modules via radio frequency integrated circuit (RFIC) 330. RFIC 330 controls two-way wireless network communication by the control system 300. Wireless networks and communication devices can include local area network (LAN) which may include a user remote control device, wide area network (WAN), wireless mesh network (WMN), "smart home" systems and devices such as hubs and smart thermostats, among numerous other types of communication device or system. Control system 300 may employ standard wireless communication protocols such as Bluetooth, WiFi, Z-Wave, ZigBee and THREAD.

Output interface 340 controls system outputs from microprocessor 310 to output devices such as LEDs 342 and speaker 344. Output interface 340 controls display of visual cues and audio cues to identify external motor control system states and to communicate messages. Input interface 350 controls system inputs from input devices such as capacitive touch device 352 and buttons 354. Input interface 350 recognizes given user inputs that can be mapped by microprocessor 310 to shade control functions in a command generator. For example, input interface 350 may recognize given user finger gestures at a touch strip or other capacitive touch device 352.

In an embodiment, encoder 322 is an optical encoder that outputs a given number of pulses for each revolution of the motor 302. The microcontroller 310 advantageously counts these pulses and analyzes the pulse counts to determine operational and positional characteristics of the window covering installation. Other types of encoders may also be used, such as magnetic encoders, mechanical encoders, etc. The number of pulses output by the encoder may be associated with a linear displacement of the blind fabric 204 by a distance/pulse conversion factor or a pulse/distance conversion factor. For example with reference to FIG. 5, when the window blind 204 is at a fully closed position (0% openness), a button of external motor 210 can be pressed and held to have the window blind raise to the top of the window frame, and the button can be released once at the top. The external motor 210 is able to measure this travel as the total length (height) of the fabric 204 and thus determine its fully open position, fully closed position, and levels of openness in between.

In an embodiment, control system 300 monitors various modes of system operation and engages or disengages the clutch 306 depending on the operational state of system 300. In one embodiment, when DC motor 302 is rotating its output shaft under user (operator) control, or under automatic control by microcontroller 310, clutch 306 is engaged thereby advancing continuous cord loop 320. When microcontroller 310 is not processing an operator command or automated function to advance the continuous cord loop, clutch 306 is disengaged, and a user may advance continuous cord loop manually to operate the windows covering system. In the event of power failure, clutch 306 will be disengaged, allowing manual operation of the windows covering system.

Figure 8:
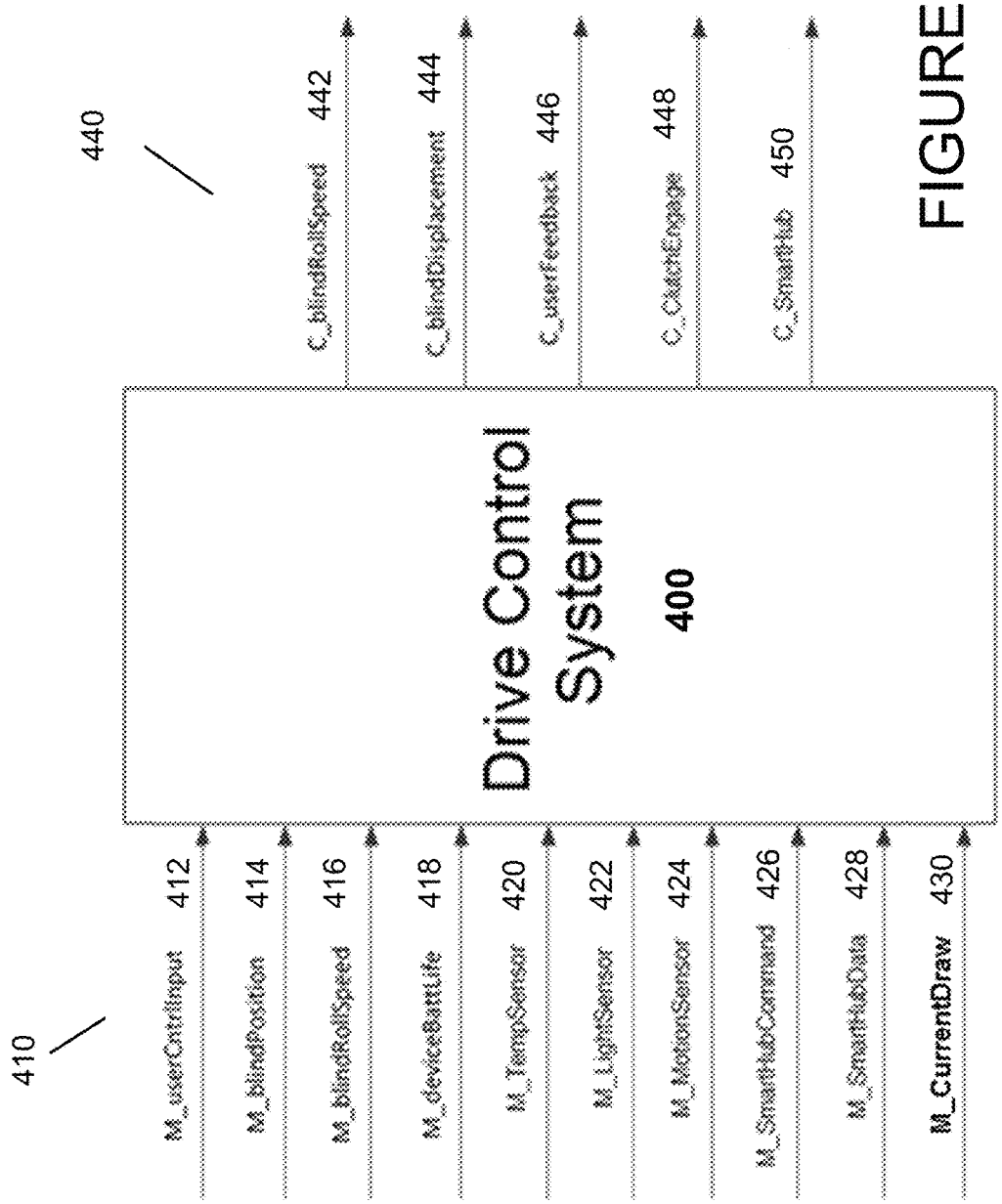
FIG. 8 is a schematic diagram of monitored and controlled variables of an external motor control system for a window covering system, according to an embodiment.

FIG. 8 is an input/output (black box) diagram of an external motor control system 400.

Monitored variables (inputs) 410 of external motor control system 400 include:
412—user input command for blind control (e.g., string packet containing command)
414—distance of current position from top of blind (e.g., in meters)
416—rolling speed of the blind (e.g., in meters per second)
418—current charge level of battery (e.g., in mV)
420—temperature sensor output (e.g., in mV)
422—light sensor output (e.g., in mV)
424—motion sensor output (e.g., in mV)
426—smart-home hub command (e.g., string packet containing command)
428—smart-home data (e.g., thermostat temperature value in degrees Celsius)
430—current draw of the motor 302 (e.g., in A)

Controlled variables (outputs) 440 of external motor control system 400 include:
442—intended rolling speed of the blind at a given time (e.g., in meters per second)
444—intended displacement from current position at a given time (e.g., in meters)
446—feedback command from the device for user (e.g., string packet containing command)
448—clutch engage/disengage command at a given time
450—output data to smart-home hub (e.g., temperature value in degrees Celsius corresponding to temperature sensor output 420).

In an embodiment, external motor control system 400 sends data (such as sensor outputs 432, 434, and 436) to a third party home automation control system or device. The third-party system or device can act upon this data to control other home automation functions. Third-party home automation devices include for example "smart thermostats" such as the Honeywell Smart Thermostat (Honeywell International Inc., Morristown, N.J.); Nest Learning Thermostat (Nest Labs, Palo Alto, Calif.); Venstar programmable thermostat (Venstar, Inc., Chatsworth, Calif.); and Lux programmable thermostat (Lux Products, Philadelphia, Pa.). Other home automation devices include HVAC (heating, ventilating, and air conditioning) systems, and smart ventilation systems.

In another embodiment, external motor control system 400 accepts commands, as well as data, from third-party systems and devices and acts upon these commands and data to control the windows covering system.

In an embodiment, the external motor control system 400 schedules operation of the windows covering system via user-programmed schedules.

In another embodiment, external motor control system 400 controls the windows covering system based upon monitored sensor outputs. For example, based upon light sensor output 422, the window covering system may automatically open or close based upon specific lighting conditions such as opening blinds at sunrise. In another example, based upon motion sensor output 424, the system may automatically open blinds upon detecting a user entering a room. In a further example, based upon temperature sensor output 420, the system may automatically open blinds during daylight to warm a cold room. Additionally, the system may store temperature sensor data to send to other devices.

In an embodiment, sensor outputs of motion sensor 424 are incorporated in a power saving process. Sensor 424 may be a presence/motion sensor in the form of a passive infrared (PIR) sensor, or may be a capacitive touch sensor, e.g., associated with a capacitive touch input interface of the external motor. In this process, the external motor system 400 hibernates/sleeps until the presence/motion sensor detects motion or the presence of a user. In an embodiment, upon sensing user presence/motion, an LED indicator of the external motor device lights up to indicate that the device can be used. In an embodiment, after a period of inactivity, the device enters a low power state to preserve energy.

In a further embodiment, external motor control system 400 controls multiple windows covering systems, and may group window covering systems to be controlled together as described above relative to Group Mode controls. Examples of groups include external motors associated with windows facing in a certain direction, and external motors associated with windows located on a given story of a building.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A motor drive system, comprising:
  a motor configured to operate under electrical power to rotate an output shaft of the motor, wherein the motor is external to a mechanism for raising and lowering a window covering;
  a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering;
  a controller for providing positional commands to the motor and the drive assembly to control the advancing the continuous cord loop in the first direction and the advancing the continuous cord loop in the second direction; and
  an input-output device for the controller, including an input interface that receives user inputs along an input axis to cause the controller to provide the positional commands to the motor and the drive assembly, and further including a visual display aligned with the input axis of the input interface;
  wherein the drive assembly comprises a driven wheel configured for engaging and advancing the continuous cord loop coupled to the mechanism for raising and lowering the window covering, and an electrically powered coupling mechanism coupling the driven wheel to the output shaft of the motor and configured for rotating the driven wheel in first and second senses, wherein rotation of the driven wheel in a first sense advances the continuous cord loop in the first direction, and rotation of the driven wheel in a second sense advances the continuous cord loop in the second direction, and wherein the controller provides the positional commands to the motor and the electrically powered coupling mechanism to control the rotation of the driven wheel in the first and second senses.

2. The motor drive system as defined in claim 1, further comprising a housing containing the motor, the driven wheel, the electrically powered coupling mechanism, and the controller; and a power button on the exterior of the housing for engaging and disengaging the driven wheel with the electrically powered coupling mechanism, or for activating and deactivating supply of electrical power to the motor configured to operate under electrical power and to the electrically powered coupling mechanism.

3. The motor drive system as defined in claim 1, wherein the visual display is an LEDs strip that provides one or more of LED light signals at varying positions along the input axis, LED light signals of varying RGB color values, and steady or flashing LED light signals.

4. The motor drive system as defined in claim 1, wherein the input interface is a touch strip interface configured to recognize user gestures along the input axis selected from the group consisting of touching, pressing, pushing, tapping, double tapping, two finger tapping, swiping, waving, and multi-touch gestures.

5. The motor drive system as defined in claim 1, further comprising a presence/motion sensor, wherein the controller includes a power saving state in which the motor drive system operates under low power until the presence/motion sensor detects motion or the presence of a user.

6. A motor drive system, comprising:
a motor configured to operate under electrical power to rotate an output shaft of the motor, wherein the motor is external to a mechanism for raising and lowering a window covering;
a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering;
a controller for providing positional commands to the motor and the drive assembly to control the advancing the continuous cord loop in the first direction and the advancing the continuous cord loop in the second direction;
an input-output device for the controller, including an input interface that receives user inputs along an input axis to cause the controller to provide the positional commands to the motor and the drive assembly, and further including a visual display aligned with the input axis of the input interface; and
a housing containing the motor, the drive assembly, and the controller, wherein the input interface comprises a touch strip disposed on the exterior of the housing along the input axis, and wherein the visual display comprises an LEDs strip that provides LED light signals aligned with the touch strip.

7. The motor drive system as defined in claim 6, wherein the touch strip comprises a capacitive touch strip.

8. A motor drive system, comprising:
a motor configured to operate under electrical power to rotate an output shaft of the motor, wherein the motor is external to a mechanism for raising and lowering a window covering;
a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering;
a controller for providing positional commands to the motor and the drive assembly to control the advancing the continuous cord loop in the first direction and the advancing the continuous cord loop in the second direction; and
an input-output device for the controller, including an input interface that receives user inputs along an input axis to cause the controller to provide the positional commands to the motor and the drive assembly, and further including a visual display aligned with the input axis of the input interface;
further comprising a housing containing the motor, the electrically powered drive system, and the controller, wherein the input-output device extends vertically on the exterior of the housing.

9. A motor drive system, comprising:
a motor configured to operate under electrical power to rotate an output shaft of the motor, wherein the motor is external to a mechanism for raising and lowering a window covering;
a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering;
a controller for providing positional commands to the motor and the drive assembly to control the advancing the continuous cord loop in the first direction and the advancing the continuous cord loop in the second direction;
an input-output device for the controller, including an input interface that receives user inputs along an input axis to cause the controller to provide the positional commands to the motor and the drive assembly, and further including a visual display aligned with the input axis of the input interface; and
a set control for user calibration of a top position and a bottom position of the window covering, wherein the positional commands to the motor and the electrically powered drive system controls the raising and lowering the window covering between the top position and the bottom position;
wherein the input axis extends between an upper end and a lower end, wherein the input interface is configured to receive the user inputs along the input axis corresponding to positions of the window covering between the top position and the bottom position, and wherein the input interface is configured to receive the user inputs at the upper end and the lower end of the input axis respectively corresponding to the top position and the bottom position.

10. A motor drive system, comprising:
a first motor configured to operate under electrical power to rotate an output shaft of the motor, wherein the first motor is external to a first mechanism for raising and lowering a window covering;
a drive system configured for engaging and advancing a continuous cord loop coupled to the first mechanism for raising and lowering the window covering, wherein advancing the continuous cord loop in a first direction raises the window covering, and advancing the continuous cord loop in a second direction lowers the window covering;
a controller for providing positional commands to the first motor and the first electrically powered drive system to control the advancing the continuous cord loop in the first direction and the advancing the continuous cord loop in the second direction;
an RF communication module operatively coupled to the controller for controlling RF communication of the positional commands to a network of other motor drive systems for operating respective other mechanisms for raising and lowering respective other window coverings; and
a group mode module, for identifying one or more of the other motor drive systems included in a user-selected group, and for causing the RF communication module to communicate the positional commands to the identified one or more of the other motor drive systems to operate the respective other mechanisms in accordance with the positional commands.

11. The motor drive system as defined in claim 10, further comprising a set control for user calibration of a top position and a bottom position of the window covering, wherein the positional commands to the motor and the electrically powered drive system controls the raising and lowering the window covering between the top position and the bottom position.

12. The motor drive system as defined in claim 11, wherein the group mode module causes the RF communication module to communicate the positional commands to the identified one or more of the other motor drive systems to operate the respective other mechanisms in accordance with the positional commands and in accordance with a calibration of a respective top position and a respective bottom position for each of the identified one or more of the other motor drive systems.

13. The motor drive system as defined in claim 12, further comprising an LEDs strip, wherein the LEDs strip displays a first visual cue when the controller of the motor drive strip enters a group pairing mode to enable the identifying the one or more of the other motor drive systems included in the user-selected group, and displays a second visual cue when the controller of the motor drive strip successfully completes the identifying the one or more of the other motor drive systems included in the user-selected group.

14. The motor drive system as defined in claim 10, further comprising a housing containing the motor, the electrically powered drive system, and the controller, wherein the group mode module includes a group mode button on the exterior of the housing.

15. A motor drive system, comprising:
a motor configured to operate under electrical power to rotate an output shaft of the motor, wherein the motor is external to a mechanism for raising and lowering a window covering;
a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering;
a controller for providing positional commands to the motor and the drive assembly to control the advancing the continuous cord loop in the first direction and the advancing the continuous cord loop in the second direction to control the raising and lowering the window covering;
a set control module for user calibration of a top position and a bottom position of the window covering, wherein following the user calibration the controller limits the raising and lowering the window covering between the top position and the bottom position; and
a housing containing the motor, the electrically powered drive system, and the controller, wherein the set control module includes a set button on the exterior of the housing, wherein pressing the set button causes one or both of initiating the user calibration of the top position and the bottom position of the window covering, and confirming the user calibration of the top position and the bottom position of the window covering.

16. The motor drive system of claim 15, further comprising a touch strip interface extending vertically along an input axis, wherein the touch strip interface recognizes user gestures along the input axis to generate the positional commands to the motor and the drive assembly to control the advancing the continuous cord loop in the first direction and the advancing the continuous cord loop in the second direction.

17. A motor drive system, comprising:
a motor configured to operate under electrical power to rotate an output shaft of the motor, wherein the motor is external to a mechanism for raising and lowering a window covering;
a drive assembly configured for engaging and advancing a continuous cord loop coupled to the mechanism for raising and lowering the window covering, wherein advancing the continuous cord loop in a first direction raises the window covering, and advancing the continuous cord loop in a second direction lowers the window covering;
a controller for providing positional commands to the motor and the drive assembly to control the advancing the continuous cord loop in the first direction and the advancing the continuous cord loop in the second direction to control the raising and lowering the window covering;
a set control module for user calibration of a top position and a bottom position of the window covering, wherein following the user calibration the controller limits the raising and lowering the window covering between the top position and the bottom position; and
a group mode module that communicates the positional commands to one or more of the other motor drive systems following the user calibration, wherein the positional commands cause respective other mechanisms of the one or more other motor drive systems to raise and lower respective window coverings in accordance with a calibration of a respective top position and a respective bottom position for each of the one or more of the other motor drive systems.

* * * * *